US010373733B2

(12) United States Patent
Kambe et al.

(10) Patent No.: US 10,373,733 B2
(45) Date of Patent: Aug. 6, 2019

(54) INSULATED ELECTRIC WIRE FOR AUTOMOBILE

(71) Applicant: YAZAKI CORPORATION, Minato-ku, Tokyo (JP)

(72) Inventors: Makoto Kambe, Shizuoka (JP); Kousuke Kogo, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 58 days.

(21) Appl. No.: 15/409,812

(22) Filed: Jan. 19, 2017

(65) Prior Publication Data

US 2017/0133123 A1 May 11, 2017

Related U.S. Application Data

(60) Division of application No. 13/554,009, filed on Jul. 20, 2012, now Pat. No. 9,583,234, which is a (Continued)

(30) Foreign Application Priority Data

Mar. 2, 2010 (JP) ................................ 2010-045096

(51) Int. Cl.
*H01B 7/00* (2006.01)
*C08K 3/22* (2006.01)
(Continued)

(52) U.S. Cl.
CPC ....... *H01B 7/0045* (2013.01); *B60R 16/0207* (2013.01); *C08K 3/22* (2013.01);
(Continued)

(58) Field of Classification Search
CPC ................ C08L 2201/02; C08L 23/10; C08L 2203/202; C08L 23/06; C08L 23/12;
(Continued)

(56) References Cited

U.S. PATENT DOCUMENTS 4,407,992 A 10/1983 Keogh
5,650,205 A 7/1997 Shukushima
(Continued)

FOREIGN PATENT DOCUMENTS

CN 1890317 A 1/2007
CN 101323689 A 12/2008
(Continued)

OTHER PUBLICATIONS

European Search Report issued by European Patent Office in counterpart European Application No. 11750699.8.
(Continued)

*Primary Examiner* — Timothy J Thompson
*Assistant Examiner* — Paresh H Paghadal
(74) *Attorney, Agent, or Firm* — Sughrue Mion, PLLC

(57) ABSTRACT

The present invention relates to an insulated electric wire for an automobile containing a conductor and an insulating coating layer which coats the conductor, the insulating coating layer being formed of a non-crosslinkable resin composition containing 65 to 90 parts by weight of a polypropylene-based resin, 10 to 40 parts by weight of a metal hydroxide, 20 to 50 parts by weight of a bromine-based flame retardant, 5 to 30 parts by weight of antimony trioxide, and 2 to 15 parts by weight of a maleic acid-modified resin in the ratio and further containing at least one of 3 to 10 parts by weight of a polyethylene resin and 2 to 10 parts by weight of an ethylene-based copolymer.

2 Claims, 1 Drawing Sheet

1
3
2

Related U.S. Application Data continuation of application No. PCT/JP2011/054772, filed on Mar. 2, 2011.

(51) Int. Cl.

| | |
|---|---|
| ***H01B 7/29*** | (2006.01) |
| ***H01B 3/44*** | (2006.01) |
| ***C08L 23/10*** | (2006.01) |
| ***H01B 7/295*** | (2006.01) |
| ***B60R 16/02*** | (2006.01) |
| ***C09D 123/12*** | (2006.01) |
| ***C08L 23/06*** | (2006.01) |
| ***C08L 23/16*** | (2006.01) |
| ***C08L 51/06*** | (2006.01) |
| *C08K 3/32* | (2006.01) |
| *H01B 7/22* | (2006.01) |
| *H01B 3/30* | (2006.01) |

(52) U.S. Cl.

CPC ............... *C08L 23/06* (2013.01); *C08L 23/10* (2013.01); *C08L 23/16* (2013.01); *C08L 51/06* (2013.01); *C09D 123/12* (2013.01); *H01B 3/441* (2013.01); *H01B 3/443* (2013.01); *H01B 7/292* (2013.01); *H01B 7/295* (2013.01); *C08K 3/2279* (2013.01); *C08K 3/32* (2013.01); *C08L 2201/02* (2013.01); *C08L 2203/202* (2013.01); *C08L 2205/03* (2013.01); *C08L 2207/04* (2013.01); *H01B 3/30* (2013.01); *H01B 7/22* (2013.01)

(58) Field of Classification Search

CPC .......... C08L 23/16; C08L 23/26; C08L 21/00; C08L 2203/206; C08L 2205/03; C08L 2205/035; C08L 2207/04; C08L 51/06; C08L 51/08; H01B 7/28; H01B 7/0208; H01B 7/292; H01B 7/295; H01B 3/04; H01B 3/30; H01B 3/441; H01B 3/443; H01B 3/082; C08K 5/136; C08K 5/0066; C08K 3/16; C08K 3/2279; C09D 123/12

See application file for complete search history.

(56) References Cited

U.S. PATENT DOCUMENTS

| | | | | |
|---|---|---|---|---|
| 7,713,620 | B2 | 5/2010 | Hase | |
| 8,829,351 | B2 | 9/2014 | Kogo | |
| 2007/0048524 | A1 | 3/2007 | Hase | |
| 2009/0036587 | A1 * | 2/2009 | Chang .................... | C08L 23/10 524/436 |
| 2009/0183893 | A1 | 7/2009 | Kambe | |
| 2010/0147549 | A1 * | 6/2010 | Shiina .................. | H01B 7/295 174/113 C |
| 2013/0008691 | A1 * | 1/2013 | Shimada ................ | C08L 23/10 174/120 C |

FOREIGN PATENT DOCUMENTS

| | | | |
|---|---|---|---|
| JP | H2-73838 | A | 3/1990 |
| JP | 6-290638 | A | 10/1994 |
| JP | 2002-140941 | A | 5/2002 |
| JP | 2005-162931 | A | 6/2005 |
| JP | 2007-211106 | A | 9/2007 |
| JP | 2007-246726 | A | 9/2007 |
| JP | 2007-277530 | A | 10/2007 |
| JP | 2008-239901 | A | 10/2008 |
| JP | 2009-019190 | A | 1/2009 |
| JP | 2009-51918 | A | 3/2009 |

OTHER PUBLICATIONS

International Search Report (PCT/ISA/210), issued by the International Searching Authority in corresponding International Application No. PCT/JP2011/054772 dated Jun. 7, 2011.

Office Action dated Feb. 20, 2014, issued by the European Patent Office in counterpart European Application No. 11750699.8.

Office Action dated Jan. 8, 2014, issued by the State Intellectual Property Office of the People's Republic of China in counterpart Chinese Application No. 201180012108.7.

Written Opinion (PCT/ISA/237) of the International Searching Authority, issued in corresponding International Application No. PCT/JP2011/054772 dated Jun. 7, 2011.

* cited by examiner

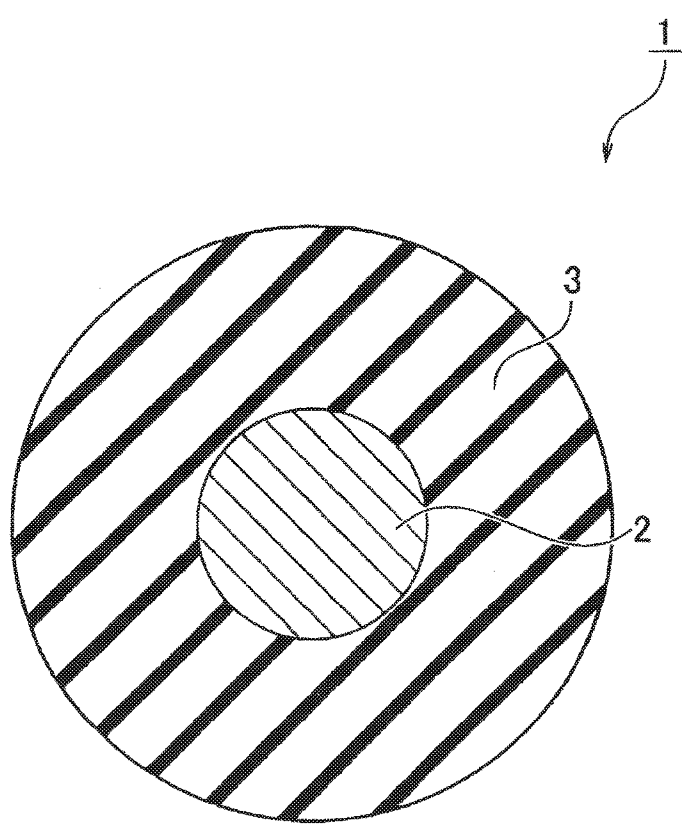
1
3
2

INSULATED ELECTRIC WIRE FOR AUTOMOBILE

CROSS REFERENCE TO RELATED APPLICATION

This application is a divisional of application Ser. No. 13/554,009, filed Jul. 20, 2012, which is a continuation of PCT Application No. PCT/JP2011/054772, filed on Mar. 2, 2011, which claims foreign priority to Japanese Patent Application No. 2010-045096, filed on Mar. 2, 2010, the contents of all of which are incorporated herein by reference in their entirety. Also, all the references cited herein are incorporated as a whole.

BACKGROUND OF THE INVENTION

1. Technical Field

The present invention relates to an insulated electric wire for an automobile. More particularly, the invention relates to an insulated electric wire for an automobile, such as an insulated electric wire and a wire harness to be used as internal wiring of automobiles, automotive devices, and the like having a high ASR (shredder dust) recycling rate.

2. Background Art

As an insulating coating material for insulated electric wires to be used as wiring in the inside of an automobile, properties such as flame retardancy, abrasion resistance, heat resistance, cold resistance, and humidity resistance are defined in ISO 6722. As an insulating coating material satisfying such properties, there are polyvinyl chloride (PVC)-based resins and polyolefin-based resins mixed with a halogen-based flame retardant containing bromine (Br), chlorine (Cl), or the like in the molecule. However, in recent years, halogen-free electric wires containing no halogen and containing a large amount of magnesium hydroxide added thereto have been known (for example, JP-A-2007-246726 and JP-A-2-73838).

SUMMARY OF THE INVENTION

However, in conventional halogen-free electric wires, it is known that dynamic properties and abrasion resistance are remarkably decreased by adding a large amount of magnesium hydroxide, which is a metal hydroxide flame retardant, to an insulating coating material. For the reason, the properties are maintained by adding various additives and modifying materials to the insulating coating material. Moreover, in order to maintain the flame retardancy of the insulating coating material, it has been unavoidable to add a large amount of magnesium hydroxide. Therefore, in the insulated electric wire using the insulating coating material containing a large amount of magnesium hydroxide, the ASR (shredder dust) recycling rate decreases by about 25% as compared with the insulated electric wire using polyvinyl chloride as an insulating coating material and thus there is a possibility that the former insulating coating material exerts an adverse influence on the environment.

Accordingly, an object of the present invention is to provide an insulated electric wire for an automobile capable of suppressing the decrease in the flame retardancy with reducing the amount of the metal hydroxide flame retardant such as magnesium hydroxide to be added, improving the ASR recycling rate, and suppressing the decrease in the properties.

The gist of the invention lies in the following.

<1> An insulated electric wire for an automobile comprising a conductor and an insulating coating layer which coats the conductor, the insulating coating layer being formed of a non-crosslinkable resin composition containing 65 to 90 parts by weight of a polypropylene-based resin, 10 to 40 parts by weight of a metal hydroxide, 20 to 50 parts by weight of a bromine-based flame retardant, 5 to 30 parts by weight of antimony trioxide, and 2 to 15 parts by weight of a maleic acid-modified resin in the ratio and further containing at least one of 3 to 10 parts by weight of a polyethylene resin and 2 to 10 parts by weight of an ethylene-based copolymer.

The non-crosslinkable resin composition having such a mixing ratio can suppress the amount of the metal hydroxide to be added, with securing flame retardancy, by adding 20 to 50 parts by weight of a bromine-based flame retardant and 5 to 30 parts by weight of antimony trioxide in the above ratio. By controlling the composition to such a ratio, the decrease in abrasion resistance of the non-crosslinkable resin composition can be presented.

<2> A wire harness for an automobile comprising an electric wire bundle containing a plurality of insulated electric wires and an insulating protective material containing a non-crosslinkable resin composition which protects outer periphery of the electric wire bundle, the non-crosslinkable resin composition containing 65 to 90 parts by weight of a polypropylene-based resin, 10 to 40 parts by weight of a metal hydroxide, 20 to 50 parts by weight of a bromine-based flame retardant, 5 to 30 parts by weight of antimony trioxide, and 2 to 15 parts by weight of a maleic acid-modified resin in the ratio and further containing at least one of 3 to 10 parts by weight of a polyethylene resin and 2 to 10 parts by weight of an ethylene-based copolymer.

Thereby, there can be provided a wire harness for an automobile, which comprises an insulating protective material containing the above non-crosslinkable resin composition.

<3> An insulated electric wire for an automobile comprising a conductor and an insulating coating layer which coats the conductor, the insulating coating layer being formed of a non-crosslinkable resin composition containing 65 to 90 parts by weight of a polypropylene-based resin, 10 to 40 parts by weight of a metal hydroxide, 20 to 50 parts by weight of a bromine-based flame retardant, 5 to 30 parts by weight of antimony trioxide, 2 to 15 parts by weight of a maleic acid-modified resin, 3 to 10 parts by weight of a polyethylene resin, and 2 to 10 parts by weight of an olefin-based thermoplastic elastomer in the ratio.

<4> A wire harness for an automobile comprising an electric wire bundle containing a plurality of insulated electric wires and an insulating protective material containing a non-crosslinkable resin composition which protects outer periphery of the electric wire bundle, the non-crosslinkable resin composition containing 65 to 90 parts by weight of a polypropylene-based resin, 10 to 40 parts by weight of a metal hydroxide, 20 to 50 parts by weight of a bromine-based flame retardant, 5 to 30 parts by weight of antimony trioxide, 2 to 15 parts by weight of a maleic acid-modified resin, 3 to 10 parts by weight of a polyethylene resin, and 2 to 10 parts by weight of an olefin-based thermoplastic elastomer in the ratio.

According to the invention, there is an advantage that an insulated electric wire for an automobile can be realized, the insulated electric wire being capable of reducing the amount of the metal hydroxide flame retardant to be added, improving the ASR recycling rate, and suppressing the decrease in abrasion resistance.

BRIEF DESCRIPTION OF THE DRAWING

FIG. 1 is a cross-sectional view of an insulated electric wire for an automobile according to the embodiment of the invention.

DETAILED DESCRIPTION OF THE EXEMPLARY EMBODIMENTS

The following will explain the insulated electric wire for an automobile according to the embodiment of the present invention.

In the Description, "% by weight" and "part(s) by weight" have the same meanings as "% by mass" and "part(s) by mass", respectively.

In the invention, halogen-free or non-halogen means that any halogen compound is not contained as an effective component for exhibiting various functions such as flame retardancy in the resin composition and does not mean that halogens as impurities or the like slightly contained unavoidably are also not contained.

As shown in FIG. 1, an insulated electric wire 1 for an automobile is constituted by coating a conductor 2 with an insulating coating 3 composed of a non-crosslinkable resin to be mentioned later. In this regard, in the present embodiment, a single conductor 2 is coated with the insulating coating 3 but, needless to say, it is also possible to be a constitution that a bundle of a plurality of the conductors 2 is coated with the insulating coating 3.

The non-crosslinkable resin composition used as the insulating coating 3 of the insulated electric wire 1 for an automobile according to the embodiment of the invention contains 65 to 90 parts by weight, preferably 70 to 80 parts by weight of a polypropylene-based resin, 10 to 40 parts by weight, preferably 20 to 40 parts by weight of a metal hydroxide, 20 to 50 parts by weight, preferably 20 to 40 parts by weight of a bromine-based flame retardant, 5 to 30 parts by weight, preferably 10 to 30 parts by weight of antimony trioxide, and 2 to 15 parts by weight of a maleic acid-modified resin in the ratio. The composition further contains at least one of 3 to 10 parts by weight, preferably 5 to 10 parts by weight of a polyethylene resin and 2 to 10 parts by weight of an ethylene-based copolymer.

Antimony trioxide used in the embodiment has a function of improving the flame retardancy of the non-crosslinkable resin by adding the compound to the non-crosslinkable reins together with the above bromine-based flame retardant. Therefore, in the embodiment, even when the amount of the metal hydroxide to be added is reduced, the flame retardancy of the non-crosslinkable resin, which forms the insulating coating 3, can be maintained.

In the embodiment, a polyethylene resin is added for the purpose of improving flexibility and cold resistance. Moreover, the metal hydroxide, the bromine-based flame retardant, and antimony trioxide are added for exhibiting the retardancy of the non-crosslinkable resin.

The polypropylene-based resin is preferably composed of one or two or more of a propylene homopolymer, a propylene-ethylene random copolymer, a propylene-α-olefin random copolymer, and a propylene-ethylene-α-olefin random copolymer, for example. In the invention, the propylene-based resin is an elemental skeleton of the composition and functions such as chemical resistance, processability, and abrasion resistance are balanced. Moreover, since the resin has the smallest specific gravity among synthetic resins, it is suitable for the addition of a filler component having a large specific gravity.

The metal hydroxide is mixed as a flame retardant. For example, use can be made of magnesium hydroxide, aluminum hydroxide, calcium hydroxide, and also those containing a metal hydroxide and exhibiting retardancy, such as hydrotalcite, talc, and clay, which have been subjected to a surface treatment with a fatty acid containing an unsaturated bond or a silane-based treating agent.

In the embodiment, in the above mixing ratio, the decrease in abrasion resistance of the non-crosslinkable resin can be prevented by further mixing the maleic acid-modified resin. The maleic acid-modified resin is added for improving dispersibility of magnesium hydroxide and also suppressing the decrease in abrasion resistance. Moreover, as the maleic acid-modified resin, a maleic acid-modified polypropylene or the like can be used.

Moreover, the ethylene-based copolymer has functions of improving flexibility and cold resistance and also easily retaining magnesium hydroxide and the bromine-based flame retardant. By the addition of the ethylene-based copolymer, an action of suppressing the decrease in abrasion resistance and flame retardancy is exhibited. As the ethylene-based copolymer, ethylene-vinyl acetate or the like can be used.

As above, in the embodiment, the flame retardancy is achieved by adding a small amount of the metal hydroxide, the bromine-based flame retardant, and antimony trioxide to the polypropylene resin and preferably, the decrease in abrasion resistance of the insulating coating 3 can be prevented by further mixing the ethylene-based copolymer and the maleic acid-modified resin. Thus, in the insulated electric wire 1 for an automobile according to the embodiment, since the mixing amount of the metal hydroxide flame retardant mixed into the non-crosslinkable resin which forms the insulating coating 3 is small, the ASR recycling rate can be improved. Moreover, since the mixing amount of the metal hydroxide flame retardant is small as above, the decrease in mechanical properties of the non-crosslinkable resin and a weight increase of the material owing to the increase in specific gravity can be suppressed.

The non-crosslinkable resin composition to be used as the insulating coating 3 of the insulated electric wire 1 for an automobile according to the other embodiment of the invention contains 65 to 90 parts by weight, preferably 70 to 80 parts by weight of a polypropylene-based resin, 10 to 40 parts by weight, preferably 20 to 40 parts by weight of a metal hydroxide, 20 to 50 parts by weight, preferably 20 to 40 parts by weight of a bromine-based flame retardant, 5 to 30 parts by weight, preferably 10 to 30 parts by weight of antimony trioxide, 2 to 15 parts by weight of a maleic acid-modified resin, further 3 to 10 parts by weight, preferably 5 to 10 parts by weight of a polyethylene resin, and 2 to 10 parts by weight of an olefin-based thermoplastic elastomer.

The polypropylene-based resin, the metal hydroxide, the bromine-based flame retardant, antimony trioxide, the maleic acid-modified resin, and the polyethylene resin are the same as in the case of the above embodiment. The olefin-based thermoplastic elastomer is composed of polyethylene, polypropylene, or the like as a hard segment and ethylene-propylene-diene rubber (EPDM), ethylene-propylene rubber (EPM), or the like as a soft segment. Examples of the olefin-based thermoplastic elastomer include Mirastomer (manufactured by Mitsui Chemicals Inc.), Sumitomo TPE (manufactured by Sumitomo Chemical Co., Ltd.), Thermorun (manufactured by Mitsubishi Chemical Corporation), and the like. They may be used singly or two or more thereof may be used in combination. Moreover, the olefin-based thermoplastic elastomer is not limited thereto and may be an olefin-based thermoplastic elastomer other than them unless it opposes the object of the invention.

EXAMPLES

The following will explain results of tests performed by the following six items of evaluation methods, with regard to Examples 1-1 to 1-19, Comparative Examples 1-1 to 1-19, Examples 2-1 to 2-19, and Comparative Examples 2-1 to 2-19.

(Evaluation of Tensile Elongation)

In accordance with JIS K 7161 (1994), a press sheet having a thickness of 1 mm punched out into No. 3 type by means of a dumbbell was used as a test piece. A tensile rate was set at 50 mm/minute. The sample showing an elongation rate of 300% or more was evaluated as "○" and the sample showing an elongation rate of less than 300% was evaluated as "X".

(Evaluation of Flame Retardancy)

For an insulated electric wire, a flame-retardant test was performed in accordance with ISO 6722 (2006). The sample which put the flame out within 70 seconds was evaluated as "○", the sample which took 70 seconds or more to less than 120 seconds for putting the flame out was evaluated to be practically not problematic and as "Δ", and the sample which took 120 seconds or more for putting the flame out was evaluated as "X".

(Evaluation of Abrasion Resistance)

It was conducted using a scrape abrasion testing machine. Namely, an insulated electric wire having a length of about 1 m was placed on a sample holder and was fixed with a clamp. Then, a plunge having a piano wire having a diameter of 0.45 mm at the tip was applied to the insulated electric wire under a total load of 7N using a pressurizing member and was reciprocated (reciprocation distance: 14 mm). The number of reciprocation times until the piano wire of the plunge touched the conductor of the insulated electric wire due to abrasion of the coating layer of the insulated electric wire was counted. When the number of times was 300 or more, it was evaluated to be qualified (○), when the number of times was less than 300 to 100 or more, it was evaluated to be practically not problematic (Δ) and, when the number was less than 100, it was evaluated to be disqualified (X).

(Evaluation of Flexibility)

A sheet-shaped test piece having a length of 80 mm, a width of 5 mm, and a thickness of 1.5 mm was prepared, 20 mm of one end of the test piece in a longitudinal direction was fixed on a fixing table, and 60 mm of another end was horizontally protruded from the fixing table. Then, 20 g of a weight was hung at a position of 10 mm from the other end and the degree of sagging of the test piece after 30 seconds was measured by means of a scale. The sample showing the degree of sagging of 15 mm or more when a power to draw the test piece was 0.08 N or less was evaluated to be qualified (○), the sample showing the degree of sagging of less than 14 mm when a power to draw the test piece was 0.09 N or more was evaluated to be practically not problematic (Δ), and the sample showing the degree of sagging of less than 13 mm when a power to draw the test piece was 0.1 N or more was evaluated to be disqualified (X).

(Evaluation of Battery Fluid Resistance)

It was conducted in accordance with ISO 6722 (2006). In the case where a sample piece was brought into contact with the battery fluid, the case where dissolution and degeneration did not occur was evaluated to be qualified (○) and the case where dissolution and/or degeneration occurred was evaluated to be disqualified (X).

The mixing ratio (unit: part(s) by weight) of each example and results of various evaluations are as shown in Tables 1 to 8. In this regard, details of individual compositions are as follows.

Polypropylene resin: trade name/PS201A (manufactured by SunAllomer Ltd.)

Ethylene-based copolymer: trade name/Elvax (manufactured by Du Pont Kabushiki Kaisha)

Maleic acid-modified resin: trade name/U-mex 1001 (manufactured by Sanyo Chemical Industries, Ltd.)

Polyethylene resin: trade name/Novatec HB332R (manufactured by Japan Polyethylene Corporation)

Metal hydroxide flame retardant: trade name/KISUMA 5A (manufactured by Kyowa Chemical Industry Co., Ltd.)

Bromine-based flame retardant: trade name/SAYTEX 8010 (manufactured by Albemarle Corporation)

Antimony trioxide: trade name/PATOX M (manufactured by Nihon Seiko Co., Ltd.)

Olefin-based thermoplastic elastomer: trade name/Thermorun Z102B (manufactured by Mitsubishi Chemical Corporation)

TABLE 1

| Composition | | Example 1-1 | Example 1-2 | Example 1-3 | Example 1-4 | Example 1-5 | Example 1-6 | Example 1-7 | Example 1-8 | Example 1-9 |
|---|---|---|---|---|---|---|---|---|---|---|
| Polypropylene resin | | 85 | 65 | 90 | 85 | 85 | 85 | 73 | 78 | 72 |
| Ethylene-based copolymer | | 5 | 10 | 5 | 5 | 5 | 5 | 2 | 10 | 10 |
| Maleic acid-modified resin | | 5 | 15 | 2 | 5 | 5 | 5 | 15 | 2 | 15 |
| Polyethylene resin | | 5 | 10 | 3 | 5 | 5 | 5 | 10 | 10 | 3 |
| Magnesium hydroxide | | 30 | 30 | 30 | 10 | 40 | 10 | 30 | 30 | 30 |
| Bromine-based flame retardant | | 30 | 30 | 30 | 50 | 20 | 20 | 30 | 30 | 30 |
| Antimony trioxide | | 10 | 10 | 10 | 30 | 5 | 30 | 10 | 10 | 10 |
| Electric wire properties | Tensile elongation | ○ | ○ | ○ | ○ | ○ | ○ | ○ | ○ | ○ |
| | Flame retardancy | ○ | ○ | ○ | ○ | ○ | ○ | ○ | ○ | ○ |
| | Abrasion resistance | ○ | ○ | ○ | ○ | ○ | ○ | ○ | ○ | ○ |
| | Flexibility | ○ | ○ | ○ | ○ | ○ | ○ | ○ | ○ | ○ |
| | Battery fluid resistance | ○ | ○ | ○ | ○ | ○ | ○ | ○ | ○ | ○ |

TABLE 2

| Composition | | Comparative Example 1-1 | Comparative Example 1-2 | Comparative Example 1-3 | Comparative Example 1-4 | Comparative Example 1-5 | Comparative Example 1-6 | Example 1-10 | Example 1-11 | Example 1-12 | Example 1-13 |
|---|---|---|---|---|---|---|---|---|---|---|---|
| Polypropylene resin | | 100 | | 95 | 60 | 60 | 60 | 77 | 79 | 73 | 88 |
| Ethylene-based copolymer | | | | 3 | 10 | 20 | 10 | 1 | 10 | 10 | 1 |
| Maleic acid-modified resin | | | | 1 | 20 | 10 | 10 | 12 | 1 | 15 | 1 |
| Polyethylene resin | | | 100 | 1 | 10 | 10 | 20 | 10 | 10 | 2 | 10 |
| Magnesium hydroxide | | 30 | 30 | 30 | 30 | 30 | 30 | 30 | 30 | 30 | 30 |
| Bromine-based flame retardant | | 30 | 30 | 30 | 30 | 30 | 30 | 30 | 30 | 30 | 30 |
| Antimony trioxide | | 10 | 10 | 10 | 10 | 10 | 10 | 10 | 10 | 10 | 10 |
| Electric wire properties | Tensile elongation | X | ○ | ○ | ○ | ○ | ○ | ○ | ○ | ○ | ○ |
| | Flame retardancy | ○ | ○ | X | ○ | ○ | ○ | Δ | Δ | ○ | Δ |
| | Abrasion resistance | ○ | X | X | X | X | X | Δ | Δ | Δ | ○ |
| | Flexibility | X | ○ | ○ | ○ | ○ | ○ | ○ | ○ | ○ | Δ |
| | Battery fluid resistance | ○ | ○ | ○ | ○ | ○ | ○ | ○ | ○ | ○ | ○ |

TABLE 3

| Composition | | Comparative Example 1-7 | Comparative Example 1-8 | Comparative Example 1-9 | Comparative Example 1-10 | Comparative Example 1-11 | Comparative Example 1-12 | Comparative Example 1-13 | Comparative Example 1-14 | Comparative Example 1-15 | Comparative Example 1-16 |
|---|---|---|---|---|---|---|---|---|---|---|---|
| Polypropylene resin | | 93 | 85 | 85 | 85 | 85 | 85 | 85 | 90 | 90 | 90 |
| Ethylene-based copolymer | | 2 | 5 | 5 | 5 | 5 | 5 | 5 | 10 | | |
| Maleic acid-modified resin | | 2 | 5 | 5 | 5 | 5 | 5 | 5 | | 10 | |
| Polyethylene resin | | 3 | 5 | 5 | 5 | 5 | 5 | 5 | | | 10 |
| Magnesium hydroxide | | 30 | 5 | | 50 | | 10 | 30 | 30 | 30 | 30 |
| Bromine-based flame retardant | | 30 | 50 | 50 | 20 | 100 | 60 | 30 | | | |
| Antimony trioxide | | 10 | 20 | 30 | 5 | 20 | 5 | 1 | | | |
| Electric wire properties | Tensile elongation | ○ | ○ | ○ | X | X | ○ | ○ | ○ | ○ | ○ |
| | Flame retardancy | ○ | X | X | ○ | ○ | ○ | X | X | X | X |
| | Abrasion resistance | X | ○ | ○ | ○ | X | X | ○ | X | ○ | X |
| | Flexibility | X | ○ | ○ | ○ | ○ | ○ | ○ | ○ | X | ○ |
| | Battery fluid resistance | ○ | ○ | ○ | X | ○ | ○ | ○ | ○ | ○ | ○ |

TABLE 4

| Composition | | Comparative Example 1-17 | Comparative Example 1-18 | Comparative Example 1-19 | Example 1-14 | Example 1-15 | Example 1-16 | Example 1-17 | Example 1-18 | Example 1-19 |
|---|---|---|---|---|---|---|---|---|---|---|
| Polypropylene resin | | 90 | 90 | 90 | 90 | 90 | 88 | 88 | 85 | 85 |
| Ethylene-based copolymer | | 10 | | | 5 | | 10 | | 5 | |
| Maleic acid-modified resin | | | 10 | | 5 | 5 | 2 | 2 | 10 | 10 |
| Polyethylene resin | | | | 10 | | 5 | | 10 | | 5 |
| Magnesium hydroxide | | 30 | 30 | 30 | 30 | 30 | 30 | 30 | 30 | 30 |
| Bromine-based flame retardant | | 30 | 30 | 30 | 30 | 30 | 30 | 30 | 30 | 30 |
| Antimony trioxide | | 10 | 10 | 10 | 10 | 10 | 10 | 10 | 10 | 10 |
| Electric wire properties | Tensile elongation | ○ | ○ | ○ | ○ | ○ | ○ | ○ | ○ | ○ |
| | Flame retardancy | X | ○ | ○ | ○ | ○ | ○ | ○ | ○ | ○ |
| | Abrasion resistance | X | ○ | X | Δ | ○ | Δ | ○ | Δ | ○ |
| | Flexibility | ○ | X | ○ | ○ | Δ | ○ | Δ | ○ | Δ |
| | Battery fluid resistance | ○ | ○ | ○ | ○ | ○ | ○ | ○ | ○ | ○ |

TABLE 5

| Composition | | Example 2-1 | Example 2-2 | Example 2-3 | Example 2-4 | Example 2-5 | Example 2-6 | Example 2-7 | Example 2-8 | Example 2-9 |
|---|---|---|---|---|---|---|---|---|---|---|
| Polypropylene resin | | 85 | 65 | 90 | 85 | 85 | 85 | 73 | 78 | 72 |
| Olefin-based thermoplastic elastomer | | 5 | 10 | 5 | 5 | 5 | 5 | 2 | 10 | 10 |
| Maleic acid-modified resin | | 5 | 15 | 2 | 5 | 5 | 5 | 15 | 2 | 15 |
| Polyethylene resin | | 5 | 10 | 3 | 5 | 5 | 5 | 10 | 10 | 3 |
| Magnesium hydroxide | | 30 | 30 | 30 | 10 | 40 | 10 | 30 | 30 | 30 |
| Bromine-based flame retardant | | 30 | 30 | 30 | 50 | 20 | 20 | 30 | 30 | 30 |
| Antimony trioxide | | 10 | 10 | 10 | 30 | 5 | 30 | 10 | 10 | 10 |
| Electric wire properties | Tensile elongation | ○ | ○ | ○ | ○ | ○ | ○ | ○ | ○ | ○ |
| | Flame retardancy | ○ | ○ | ○ | ○ | ○ | ○ | ○ | ○ | ○ |
| | Abrasion resistance | ○ | ○ | ○ | ○ | ○ | ○ | ○ | ○ | ○ |
| | Flexibility | ○ | ○ | ○ | ○ | ○ | ○ | ○ | ○ | ○ |
| | Battery fluid resistance | ○ | ○ | ○ | ○ | ○ | ○ | ○ | ○ | ○ |

TABLE 6

| Composition | | Comparative Example 2-1 | Comparative Example 2-2 | Comparative Example 2-3 | Comparative Example 2-4 | Comparative Example 2-5 | Comparative Example 2-6 | Example 2-10 | Example 2-11 | Example 2-12 | Example 2-13 |
|---|---|---|---|---|---|---|---|---|---|---|---|
| Polypropylene resin | | 100 | | 95 | 60 | 60 | 60 | 77 | 79 | 73 | 88 |
| Olefin-based thermoplastic elastomer | | | | 3 | 10 | 20 | 10 | 1 | 10 | 10 | 1 |
| Maleic acid-modified resin | | | | 1 | 20 | 10 | 10 | 12 | 1 | 15 | 1 |
| Polyethylene resin | | | 100 | 1 | 10 | 10 | 20 | 10 | 10 | 2 | 10 |
| Magnesium hydroxide | | 30 | 30 | 30 | 10 | 40 | 10 | 30 | 30 | 30 | 30 |
| Bromine-based flame retardant | | 30 | 30 | 30 | 50 | 20 | 20 | 30 | 30 | 30 | 30 |
| Antimony trioxide | | 10 | 10 | 10 | 30 | 5 | 30 | 10 | 10 | 10 | 10 |
| Electric wire properties | Tensile elongation | X | ○ | ○ | ○ | ○ | ○ | ○ | ○ | ○ | ○ |
| | Flame retardancy | ○ | ○ | X | ○ | ○ | ○ | Δ | Δ | ○ | ○ |
| | Abrasion resistance | ○ | X | X | X | X | X | Δ | Δ | Δ | ○ |
| | Flexibility | X | ○ | ○ | ○ | ○ | ○ | ○ | ○ | ○ | Δ |
| | Battery fluid resistance | ○ | ○ | ○ | ○ | ○ | ○ | ○ | ○ | ○ | ○ |

TABLE 7

| Composition | | Comparative Example 2-7 | Comparative Example 2-8 | Comparative Example 2-9 | Example 2-14 | Example 2-15 | Example 2-16 | Example 2-17 | Example 2-18 | Example 2-19 |
|---|---|---|---|---|---|---|---|---|---|---|
| Polypropylene resin | | 90 | 90 | 90 | 90 | 90 | 88 | 88 | 85 | 85 |
| Olefin-based thermoplastic elastomer | | 10 | | | 5 | | 10 | | 5 | |
| Maleic acid-modified resin | | | 10 | | 5 | 5 | 2 | 2 | 10 | 10 |
| Polyethylene resin | | | | 10 | | 5 | | 10 | | 5 |
| Magnesium hydroxide | | 30 | 30 | 30 | 10 | 40 | 10 | 30 | 30 | 30 |
| Bromine-based flame retardant | | 30 | 30 | 30 | 50 | 20 | 20 | 30 | 30 | 30 |
| Antimony trioxide | | 10 | 10 | 10 | 30 | 5 | 30 | 10 | 10 | 10 |
| Electric wire properties | Tensile elongation | ○ | ○ | ○ | ○ | ○ | ○ | ○ | ○ | ○ |
| | Flame retardancy | X | ○ | ○ | ○ | ○ | ○ | ○ | ○ | ○ |
| | Abrasion resistance | X | ○ | X | Δ | ○ | Δ | ○ | Δ | ○ |
| | Flexibility | ○ | X | ○ | ○ | Δ | ○ | Δ | ○ | Δ |
| | Battery fluid resistance | ○ | ○ | ○ | ○ | ○ | ○ | ○ | ○ | ○ |

TABLE 8

| Composition | | Comparative Example 2-10 | Comparative Example 2-11 | Comparative Example 2-12 | Comparative Example 2-13 | Comparative Example 2-14 | Comparative Example 2-15 | Comparative Example 2-16 | Comparative Example 2-17 | Comparative Example 2-18 | Comparative Example 2-19 |
|---|---|---|---|---|---|---|---|---|---|---|---|
| Polypropylene resin | | 93 | 85 | 85 | 85 | 85 | 85 | 85 | 90 | 90 | 90 |
| Olefin-based thermoplastic elastomer | | 2 | 5 | 5 | 5 | 5 | 5 | 5 | 10 | | |
| Maleic acid-modified resin | | 2 | 5 | 5 | 5 | 5 | 5 | 5 | | 10 | |
| Polyethylene resin | | 3 | 5 | 5 | 5 | 5 | 5 | 5 | | | 10 |
| Magnesium hydroxide | | 30 | 5 | | 50 | | 10 | 30 | 30 | 30 | 30 |
| Bromine-based flame retardant | | 30 | 50 | 50 | 20 | 100 | 60 | 30 | | | |
| Antimony trioxide | | 10 | 20 | 30 | 5 | 20 | 5 | 1 | | | |
| Electric wire properties | Tensile elongation | ○ | ○ | ○ | X | X | ○ | ○ | ○ | ○ | ○ |
| | Flame retardancy | ○ | X | X | ○ | ○ | ○ | X | X | X | X |
| | Abrasion resistance | X | ○ | ○ | ○ | X | X | ○ | X | ○ | ○ |
| | Flexibility | X | ○ | ○ | ○ | ○ | ○ | ○ | ○ | X | ○ |
| | Battery fluid resistance | ○ | ○ | ○ | X | ○ | ○ | ○ | ○ | ○ | ○ |

As shown in Table 2, in Comparative Example 1-1, since the ethylene-based copolymer, the maleic acid-modified resin, and the polyethylene resin were not mixed, the case was unqualified in the evaluation of tensile elongation and the evaluation of flexibility.

In Comparative Example 1-2, the polypropylene resin to be an elemental skeleton was not included, the polyethylene resin was mixed in an amount of 100 parts by weight, and the ethylene-based copolymer and the maleic acid-modified resin were not mixed. In the case where the polypropylene resin was not included as an elemental skeleton, a result of decreased abrasion resistance was obtained.

In Comparative Example 1-3, the polypropylene resin was mixed in an amount of more than 90 parts by weight, the maleic acid-modified resin was mixed in an amount of less than 2 parts by weight, and the polyethylene resin was mixed in an amount of less than 3 parts by weight. As a result, in Comparative Example 1-3, the case was unqualified in flame retardancy and abrasion resistance.

In Comparative Example 1-4, the polypropylene resin was mixed in an amount of less than 65 parts by weight and the maleic acid-modified resin was mixed in an amount of more than 15 parts by weight. As a result, in Comparative Example 1-4, the case was unqualified in abrasion resistance.

In Comparative Example 1-5, the polypropylene resin was mixed in an amount of less than 65 parts by weight, the ethylene-based resin was mixed in an amount of more than 10 parts by weight, and the case was unqualified in abrasion resistance.

In Comparative Example 1-6, the polypropylene resin was mixed in an amount of less than 65 parts by weight and the polyethylene resin was mixed in an amount of more than 10 parts by weight, so that the case was unqualified in abrasion resistance.

As shown in Table 3, in Comparative Example 1-7, the polypropylene resin was mixed in an amount of more than 90 parts by weight, and the case was unqualified in flame resistance and flexibility.

In Comparative Examples 1-8 and 1-9, magnesium hydroxide was mixed in an amount of less than 10 parts by weight or was not mixed, and the cases were unqualified in flame retardancy.

In Comparative Example 1-10, magnesium hydroxide was mixed in an amount of more than 40 parts by weight, and the case was unqualified in tensile elongation and battery fluid resistance.

In Comparative Example 1-11, magnesium hydroxide was not mixed, the bromine-based flame retardant was mixed in an amount of more than 50 parts by weight, and the case was unqualified in tensile elongation and abrasion resistance.

In Comparative Example 1-12, the bromine-based flame retardant was mixed in an amount of more than 50 parts by weight, and the case was unqualified in abrasion resistance.

In Comparative Example 1-13, antimony trioxide was mixed in an amount of less than 5 parts by weight, and the case was unqualified in flame retardancy.

In Comparative Example 1-14, the maleic acid-modified resin, the polyethylene resin, the bromine-based flame retardant, and antimony trioxide were not mixed, and the case was unqualified in flame retardancy and abrasion resistance.

In Comparative Example 1-15, the ethylene-based resin, the polyethylene resin, the bromine-based flame retardant, and antimony trioxide were not mixed, and the case was unqualified in the evaluation of flame retardancy and flexibility.

In Comparative Example 1-16, the ethylene-based resin, the maleic acid-modified resin, the bromine-based flame retardant, and antimony trioxide were not mixed, and the case was unqualified in flame retardancy and abrasion resistance.

As shown in Table 4, in Comparative Example 1-17, the maleic acid-modified resin and the polyethylene resin were not mixed, and the case was unqualified in flame retardancy and abrasion resistance.

In Comparative Example 1-18, the ethylene-based resin and the polyethylene resin were not mixed, and the case was unqualified in flexibility.

In Comparative Example 1-19, the ethylene-based copolymer and the maleic acid-modified resin were not mixed, and the case was unqualified in abrasion resistance.

As shown in Tables 1, 2, and 4, Examples 1-1 to 1-19 were within the ranges: 65 to 90 parts by weight of the polypropylene-based resin, 2 to 10 parts by weight of the ethylene-based copolymer, 2 to 15 parts by weight of the maleic acid-modified resin, 3 to 10 parts by weight of the polyethylene resin, 10 to 40 parts by weight of the metal hydroxide, 20 to 50 parts by weight of the bromine-based flame retardant, and 5 to 30 parts by weight of antimony trioxide. The cases were qualified or practically not problematic levels in all the evaluations of tensile elongation, flame retardancy, abrasion resistance, flexibility, and battery fluid resistance.

Moreover, as shown in Tables 5 to 7, Examples 2-1 to 2-19 were within the ranges: 65 to 90 parts by weight of the polypropylene-based resin, 10 to 40 parts by weight of the metal hydroxide, 20 to 50 parts by weight of the bromine-based flame retardant, 5 to 30 parts by weight of antimony trioxide, 2 to 15 parts by weight of the maleic acid-modified resin, 3 to 10 parts by weight of the polyethylene resin, and 2 to 10 parts by weight of the olefin-based thermoplastic elastomer. The cases were qualified or practically not problematic levels in all the evaluations of tensile elongation, flame retardancy, abrasion resistance, flexibility, and battery fluid resistance.

While the invention has been described in detail and with reference to specific embodiments thereof, it will be apparent to one skilled in the art that various changes and modifications can be made therein without departing from the spirit and scope thereof.

What is claimed is:

1. An insulated electric wire for an automobile comprising a conductor and an insulating coating layer which coats the conductor, the insulating coating layer being formed of a non-crosslinkable resin composition containing 65 to 90 parts by weight of a polypropylene-based resin,
10 to 40 parts by weight of a metal hydroxide,
20 to 50 parts by weight of a bromine-based flame retardant,
5 to 30 parts by weight of antimony trioxide,
2 to 15 parts by weight of a maleic acid-modified resin,
3 to 10 parts by weight of a polyethylene resin consisting of ethylene repeating units, and
2 to 10 parts by weight of an olefin-based thermoplastic elastomer.

2. A wire harness for an automobile comprising an electric wire bundle containing a plurality of insulated electric wires and an insulating protective material containing a non-crosslinkable resin composition which protects outer periphery of the electric wire bundle, the non-crosslinkable resin composition containing 65 to 90 parts by weight of a polypropylene-based resin,
10 to 40 parts by weight of a metal hydroxide,
20 to 50 parts by weight of a bromine-based flame retardant,
5 to 30 parts by weight of antimony trioxide,
2 to 15 parts by weight of a maleic acid-modified resin,
3 to 10 parts by weight of a polyethylene resin consisting of ethylene repeating units, and
2 to 10 parts by weight of an olefin-based thermoplastic elastomer.

* * * * *